US012742653B2

(12) United States Patent
Iwasaki et al.

(10) Patent No.: US 12,742,653 B2
(45) Date of Patent: Sep. 22, 2026

(54) INFORMATION PROCESSING APPARATUS, MOVABLE APPARATUS, INFORMATION PROCESSING METHOD, AND RECORDING MEDIUM FOR NOTIFICATION OF ERROR EVALUATION

(71) Applicant: CANON KABUSHIKI KAISHA, Tokyo (JP)

(72) Inventors: Yohei Iwasaki, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 18/912,760

(22) Filed: Oct. 11, 2024

(65) Prior Publication Data

US 2025/0164276 A1 May 22, 2025

(30) Foreign Application Priority Data

Nov. 17, 2023 (JP) ................................ 2023-195642

(51) Int. Cl.
*G01C 21/00* (2006.01)

(52) U.S. Cl.
CPC .................................... *G01C 21/38* (2020.08)

(58) Field of Classification Search
CPC ...................................................... G01C 21/38
See application file for complete search history.

(56) References Cited

U.S. PATENT DOCUMENTS 11,185,977 B2 11/2021 Kobayashi et al.
2010/0063648 A1* 3/2010 Anderson ............ G05D 1/0088 701/1
2018/0335307 A1* 11/2018 Chen ...................... G01C 21/32
2018/0347982 A1* 12/2018 Nam .................... G01C 21/005
2019/0236797 A1* 8/2019 Thyagharajan ......... G06T 7/593
2020/0242166 A1 7/2020 Lee et al.
2020/0242396 A1* 7/2020 Holz .................... G05D 1/0274
2021/0406559 A1* 12/2021 Efland .................. G06V 10/803
2023/0030791 A1 2/2023 Mityatani et al.
2023/0110992 A1 4/2023 Numakami et al.
2023/0134912 A1 5/2023 Wanda et al.
2023/0243667 A1 8/2023 Miyakawa et al.
2023/0342956 A1 10/2023 Ohira et al.
2024/0116500 A1 4/2024 Naganawa et al.

(Continued)

FOREIGN PATENT DOCUMENTS

JP 7105819 B2 7/2022

OTHER PUBLICATIONS

Joshi et al., "SM/VIO: Robust Underwater State Estimation Switching Between Model-based and Visual Inertial Odometry", Apr. 2023, IEEE (Year: 2023).*

(Continued)

*Primary Examiner* — Kenneth M Dunne
(74) *Attorney, Agent, or Firm* — Venable LLP

(57) ABSTRACT

An information processing apparatus acquires evaluation information for performing evaluation of at least one of a plurality of map data each generated based on measurement data of a plurality of sensors arranged on a movable apparatus. Then, the information processing apparatus evaluates an error of at least one map data of the plurality of map data based on the evaluation information and performs notification based on the evaluation of the error.

18 Claims, 7 Drawing Sheets

(56) References Cited

U.S. PATENT DOCUMENTS

| | | | |
|---|---|---|---|
| 2024/0142982 | A1 | 5/2024 | Fukamachi et al. |
| 2024/0160213 | A1 | 5/2024 | Numakami et al. |
| 2024/0161048 | A1 | 5/2024 | Miura et al. |
| 2024/0184292 | A1 | 6/2024 | Ohira et al. |

OTHER PUBLICATIONS

Mazuran et al., "A Statistical Measure for Map Consistency in SLAM", 2014, IEEE (Year: 2014).*
Co-pending U.S. Appl. No. 19/010,393, filed Jan. 6, 2025.
Co-pending U.S. Appl. No. 19/034,019, filed Jan. 22, 2025.
Co-pending U.S. Appl. No. 19/050,345, filed Feb. 11, 2025.

* cited by examiner

100
INFORMATION PROCESSING APPARATUS
307
DATA ACQUISITION UNIT
308
MAP ERROR EVALUATION UNIT
309
NOTIFICATION UNIT
310
CONTROL UNIT
10
MOVABLE APPARATUS
311
CONTROL UNIT
312
DRIVE UNIT
150
MAP GENERATION DEVICE
305
FIRST MAP STORAGE UNIT
306
SECOND MAP STORAGE UNIT
303
FIRST MAP GENERATION UNIT
304
SECOND MAP GENERATION UNIT
257
301
FIRST SENSOR
302
SECOND SENSOR

INFORMATION PROCESSING APPARATUS, MOVABLE APPARATUS, INFORMATION PROCESSING METHOD, AND RECORDING MEDIUM FOR NOTIFICATION OF ERROR EVALUATION

BACKGROUND OF THE INVENTION

Field of the Invention

The present disclosure mainly relates to information processing technology in self-localization.

Description of the Related Art

As a method of performing position/orientation estimation of a movable apparatus by using information acquired by sensors such as cameras and distance sensors mounted on the movable apparatus, SLAM (Simultaneous Localization and Mapping) technology is known. SLAM performs estimation of self-position/orientation by using a three-dimensional environmental map for determining information such as the positions of surrounding objects. In SLAM, technology has been developed to improve the accuracy of the map by using a plurality of sensors such as cameras and LiDAR (light detection and ranging).

Japanese Patent No. 7105819 discloses a method for estimating the position of a movable apparatus based on a graph structure. This method generates a graph structure by setting constraint conditions between nodes by using sensing data synchronized with a reference period, and modifies the graph structure in a case in which asynchronous sensing data that is not synchronized with the reference period has been input.

SUMMARY OF THE INVENTION

However, in the method of Japanese Patent No. 7105819, it is difficult for the user to determine the timing for performing map correction and to monitor the status of map error occurrence, leading to the accumulation of errors. It is desirable for map correction to be executed while the amount of accumulated error is still minor.

The present disclosure provides technology that enables users to appropriately determine information related to map error.

An information processing apparatus according to one aspect of the present disclosure comprises:

one or more memories storing instructions; and one or more processors executing the storing instructions to:

acquire evaluation information for performing evaluation of at least one of a plurality of map data each generated based on measurement data of a plurality of sensors arranged on a movable apparatus;

evaluate an error of at least one map data of the plurality of map data based on the evaluation information; and perform notification based on the evaluation of the error.

Further features of the present disclosure will become apparent from the following description of exemplary embodiments (with reference to the attached drawings).

BRIEF DESCRIPTION OF THE DRAWINGS

FIG. 2A is a diagram showing an example of a hardware configuration of an information processing apparatus, and FIG. 2B is a diagram showing an example of a hardware configuration of a movable apparatus.

DESCRIPTION OF THE EMBODIMENTS

Figure 1:
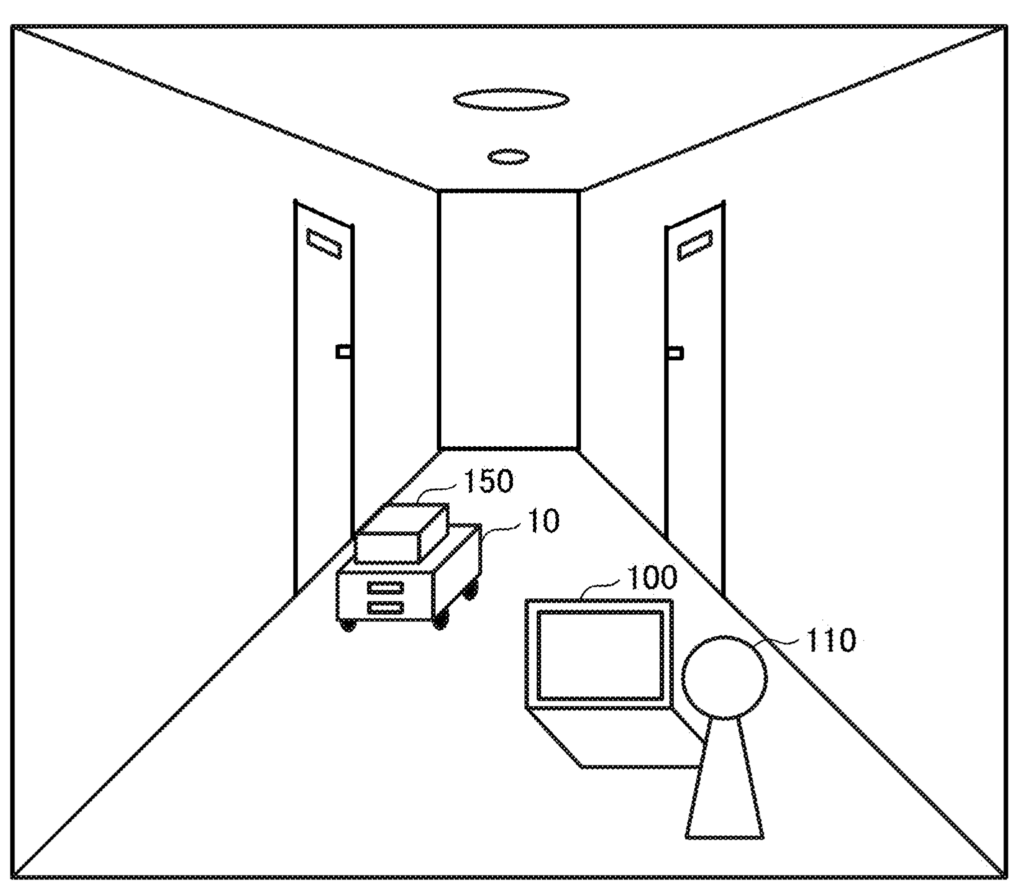
FIG. 1 is a diagram explaining a usage scenario of an information processing system according to an embodiment.

Hereinafter, embodiments of the present disclosure will be described with reference to the accompanying drawings. In the drawings, the same reference numerals are applied to the same components or elements, and repetitive descriptions will be omitted or simplified. The configurations shown in the following embodiments are merely examples, and the present disclosure is not limited to the illustrated configurations.

First Embodiment

FIG. 1 is a diagram explaining a usage scenario of an information processing system according to an embodiment. The information processing system is provided with, for example, an information processing apparatus 100 and a movable apparatus 10 that includes a map generation apparatus 150. The movable apparatus 10 is, for example, a mobile robot such as an AMR (Autonomous Mobile Robot) or an AGV (Automated Guided Vehicle).

The map generation apparatus 150 includes a function of executing self-position estimation and map generation by using, for example, SLAM technology. The present information processing system notifies a user of information related to map alignment with respect to a plurality of maps each generated based on respective measurement data of a plurality of sensors arranged on the movable apparatus 10.

An operator 110, who is a user, operates the movable apparatus 10. The operator 110 mainly operates the start and stop of movement of the movable apparatus 10 by using the information processing apparatus 100. The operator 110 receives, from the information processing apparatus 100, a notification based on evaluation of map error as a notification of the above-described information related to map alignment, based on information acquired from the map generation apparatus 150.

Figures 2A, 2B:
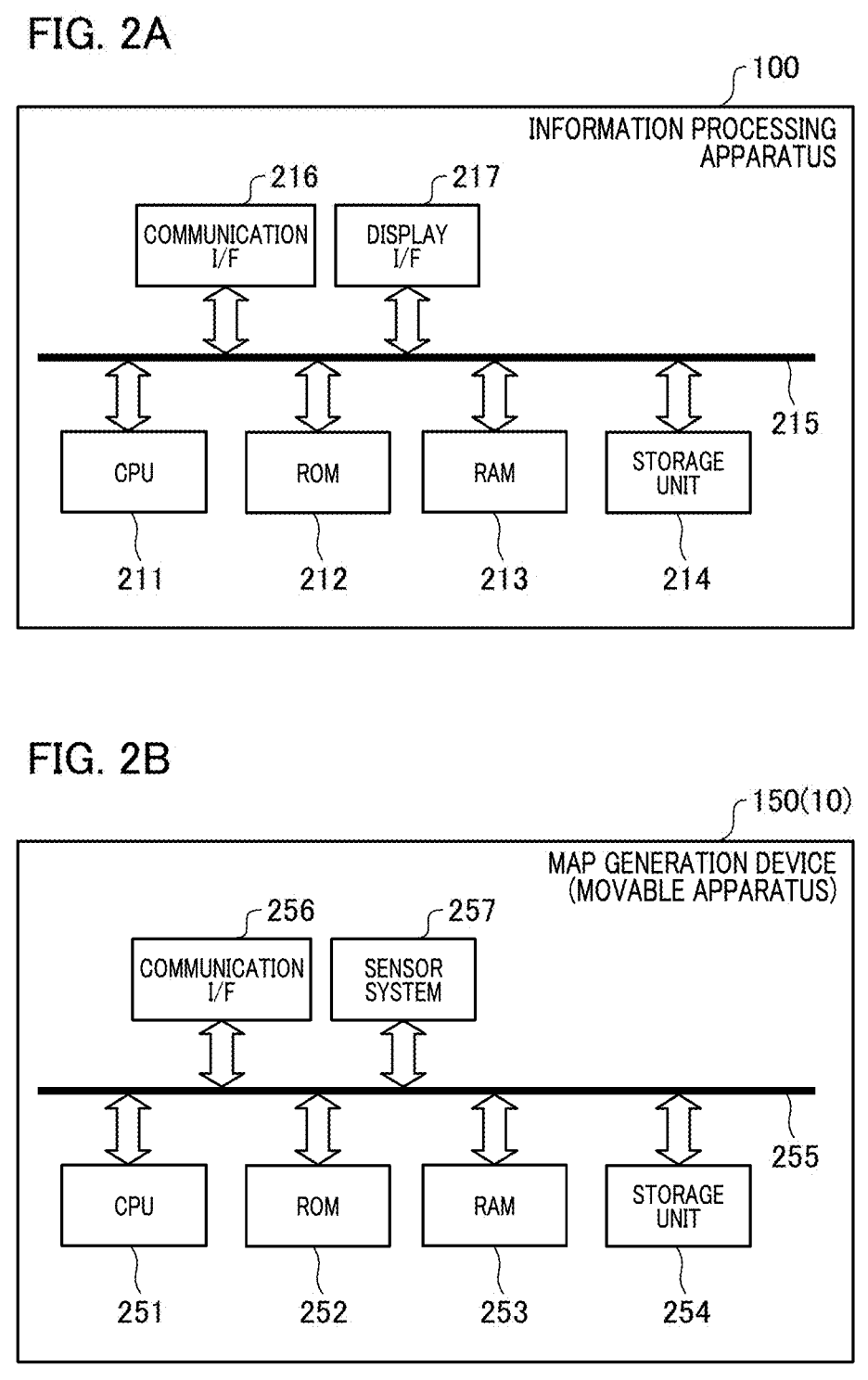

FIG. 2A is a diagram showing an example of a hardware configuration of the information processing apparatus 100. The information processing apparatus 100 is provided with PC device functions and includes a CPU 211, a ROM 212, a RAM 213, a storage unit 214, a communication interface 216, and a display interface 217, which are connected to each other via a system bus 215. The information processing apparatus 100 is not limited to a PC and may be a smartphone, a tablet computer, or the like.

The CPU 211 executes an operating system (OS) and various computer programs stored in the ROM 212, the storage unit 214, and the like by using the RAM 213 serving as a work memory, and controls each unit via the system bus

215. The programs executed by the CPU 211 include programs for executing the processing to be described below.

The communication interface 216 performs communication with the map generation apparatus 150 of the movable apparatus 10 and an external server (not shown) and the like via a network by wire or wirelessly. The network is typically Ethernet, but may be the Internet. Alternatively, the communication interface 216 may perform communication by short-range wireless communication or other serial communication. It should be noted that at least a part of the data stored in the storage unit 214 may be stored in the above-described external server.

The display interface 217 outputs display information to a display device mounted on the information processing apparatus 100 or to an external display device.

FIG. 2B is a diagram showing an example of a hardware configuration of the movable apparatus 10 (mainly the map generation apparatus 150). The map generation apparatus 150 is provided with computer functions and includes a CPU 251, a ROM 252, a RAM 253, a storage unit 254, a communication interface 256, a sensor system 257, and a system bus 255. For the hardware configuration of the map generation apparatus 150, an explanation of configurations similar to those of the information processing apparatus 100 is omitted.

The communication interface 256 has functions similar to those of the communication interface 216 of the information processing apparatus 100 and performs communication with the information processing apparatus 100 and the above-described external server and the like via a network by wire or wirelessly. It should be noted that at least a part of the data (such as map data to be described below) stored in the storage unit 254 may be stored in an external server.

The sensor system 257 includes one or more sensors that mainly acquire information related to map generation. Typically, the sensor system 257 includes a plurality of sensors. One of the sensors in the sensor system 257 is, for example, a visible light camera (image sensor), LiDAR, ToF sensor, IMU, GNSS, and the like. ToF is an abbreviation for Time of Flight, and IMU is an abbreviation for Inertial Measurement Unit. In addition, GNSS is an abbreviation for Global Navigation Satellite System. The IMU is a device that detects acceleration and angular velocity of the movable apparatus 10. The IMU may further detect geomagnetism at the measurement point thereof in addition to acceleration and angular velocity. The sensor system 257 may also, in some cases, additionally include an encoder or the like used for wheel odometry.

At least two sensors in the sensor system 257 may be of the same type among each sensor mentioned above. Hereinafter, when referring to "a plurality of sensors", this will denote sensors of different types.

It should be noted that instead of the CPUs 211 and 251, or in addition to the CPUs, a PLD (Programmable Logic Device) such as an FPGA (Field Programmable Gate Array) may be used. Alternatively, an ASIC (Application Specific Integrated Circuit) may be used, or a DSP (Digital Signal Processor) may be used. Although the storage units 214 and 254 are configured by, for example, an HDD (Hard Disk Drive), an SSD (Solid State Drive), or the like, these storage units may be an optical recording device or the like.

Basic Example

Figure 3:
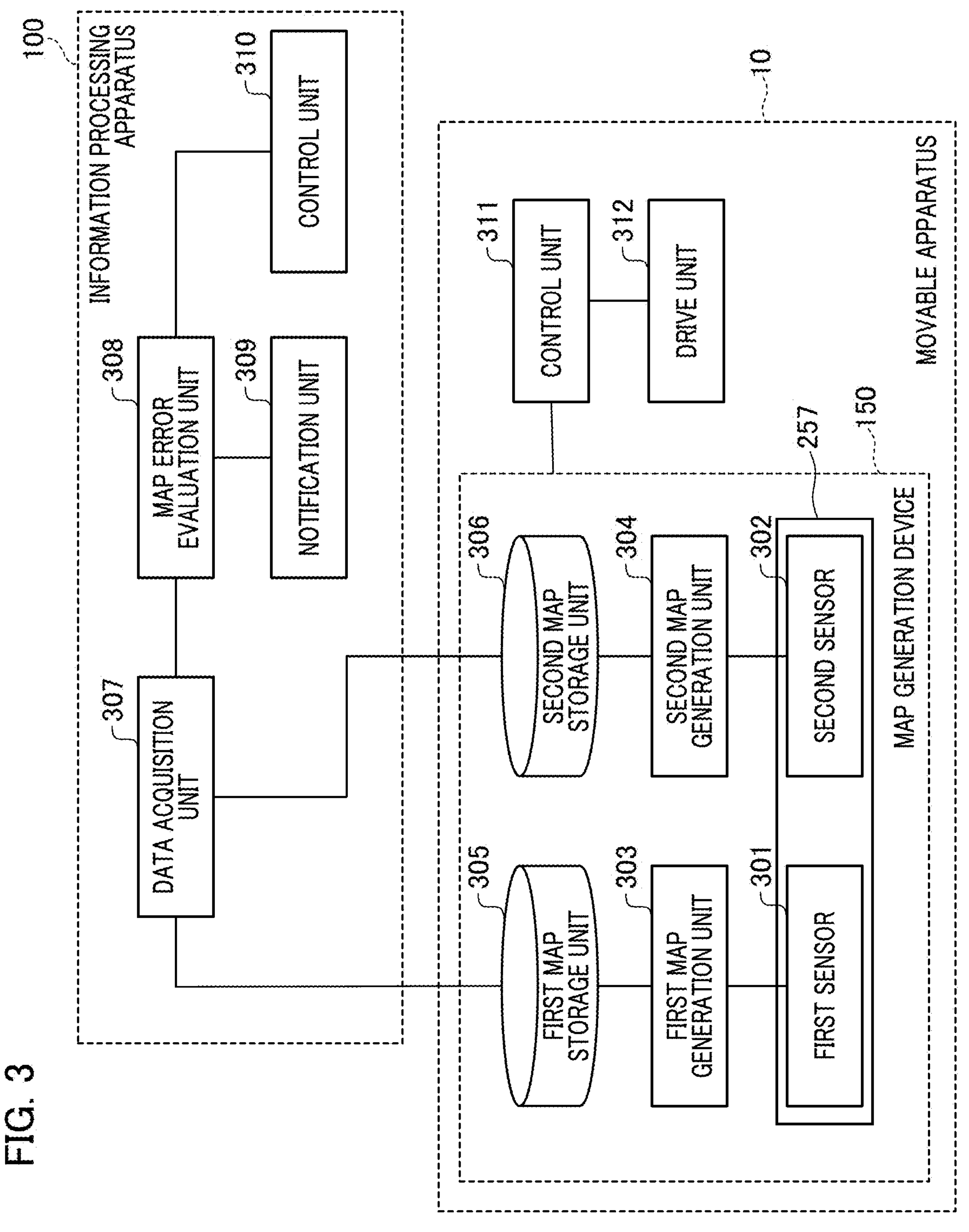
FIG. 3 is a diagram showing an example of a functional configuration of the information processing system according to a First Embodiment.

FIG. 3 is a diagram showing an example of a functional configuration of an information processing system according to the First Embodiment. The information processing apparatus 100 mainly includes a data acquisition unit 307, a map error evaluation unit 308, a notification unit 309, and a control unit 310. The movable apparatus 10 includes a map generation apparatus 150, a control unit 311, and a drive unit 312. The map generation apparatus 150 mainly includes a first sensor 301, a second sensor 302, a first map generation unit 303, a second map generation unit 304, a first map storage unit 305, and a second map storage unit 306.

In the map generation apparatus 150, the first map generation unit 303 performs map generation based on data acquired by the first sensor 301. The second map generation unit 304 performs map generation based on data acquired by the second sensor 302. The first map generation unit 303 and the second map generation unit 304 are examples of generation units that are each configured to generate a plurality of map data based on measurement data from a plurality of sensors.

The first map storage unit 305 stores first map data generated by the first map generation unit 303. The second map storage unit 306 stores second map data generated by the second map generation unit 304. The first map storage unit 305 and the second map storage unit 306 are mainly realized by the storage unit 254.

The control unit 311 mainly controls the movement of the movable apparatus 10 via the drive unit 312. For example, the control unit 311 controls the drive unit 312 based on control information transmitted from the information processing apparatus 100 and/or data acquired from the map generation apparatus 150. In addition, the control unit 311 performs control of map generation by the map generation apparatus 150. The drive unit 312 includes a motor or the like that drives wheels provided on the movable apparatus 10.

In the information processing apparatus 100, the data acquisition unit 307 mainly acquires the first map data and the second map data generated by the map generation apparatus 150. The data acquisition unit 307 is an example of an acquisition unit that acquires evaluation information for performing evaluation of at least one of a plurality of map data generated by the map generation apparatus 150.

The map error evaluation unit 308 evaluates an error of at least one of the first map data and the second map data generated by the map generation apparatus 150 based on the data acquired by the data acquisition unit 307. In the following explanation, in a case in which it is not necessary to distinguish between the first map data and the second map data, at least one of these will be simply referred to as "map data". The map error evaluation unit 308 is an example of an evaluation unit that evaluates an error of at least one of a plurality of map data.

The notification unit 309 performs notification based on the evaluation of the error based on the result evaluated by the map error evaluation unit 308 (evaluation result). Map alignment means aligning the map data with relatively larger errors among the first map data and the second map data with the map data with smaller errors, that is, correcting the errors of the map data with larger errors. The error correction method is not limited thereto, and any known method may be applied. The details of the error correction method are not important here, and thus an explanation thereof is omitted. The notification unit 309 is an example of a notification unit that performs notification based on error evaluation.

The control unit 310 outputs control information for controlling the movement of the movable apparatus 10 to the movable apparatus 10, as described above. The control information is mainly the start of movement and the stop of movement, or it may be a target movement speed. The control unit 310 typically generates control information based on operation input by the operator 110. Alternatively, the control unit 310 may output control information based on the evaluation result of the map error evaluation unit 308, as explained in Modification Example 1-2-1 to be described below.

In the present embodiment, an example will be explained in which a visible light camera (hereinafter referred to as a camera) is used as the first sensor 301 and LiDAR is used as the second sensor 302. In a case in which map generation is performed by using a camera, if there is little texture in the scene in which measurement is performed, feature points cannot be detected, the measurement accuracy of the position decreases, and the errors in the map increase. Therefore, the information processing system suppresses the increase of such map errors by detecting the occurrence of these errors. As described below, for example, there are many cases in which the scale error of the first map data generated based on data obtained by the camera is larger than the scale error of the second map data generated based on data obtained by LiDAR.

Map data is configured by a plurality of measurement points. Each measurement point includes measurement data of the sensor system 257 used for position/orientation measurement, and position/orientation information (measured position/orientation information) derived from that measurement data. In the present embodiment, the measurement data is image data and/or point cloud data obtained by the sensor (in this embodiment, a camera or LiDAR). Position/orientation means position and orientation.

The map generation apparatus 150 generates a map by performing self-position/orientation estimation. That is, the map generation apparatus 150 generates map data that includes position/orientation information for each of those measurement points by acquiring position/orientation information of the movable apparatus 10 (sensor) for each measurement point based on the measurement data of the camera or LiDAR. When the movable apparatus 10 on which a sensor is mounted generates map data, each measurement point is arranged at predetermined intervals along the movement path of the movable apparatus 10. As an example, map data may be generated in which one measurement point is arranged for every 1 meter advance along the movement path.

Here, the error (drift) in position/orientation that occurs when generating map data will be explained. The generation of map data is performed by repeating the generation of measurement points and the estimation of current position/orientation using the measurement points. Therefore, the error in position/orientation that occurred during the generation of measurement points becomes an error in subsequent position/orientation estimation using that measurement point, and errors accumulate each time the generation of measurement points is repeated. This accumulated error is referred to as “drift”.

Due to the influence of drift, a scale error occurs between the actual movement distance and the movement distance on the map data. The magnitude of this scale error differs depending on the sensor used and the position/orientation measurement method. In the present embodiment, it is assumed that the scale error of the first map data generated based on data obtained by the camera is larger than the scale error of the second map data generated based on data obtained by LiDAR.

Figure 4:
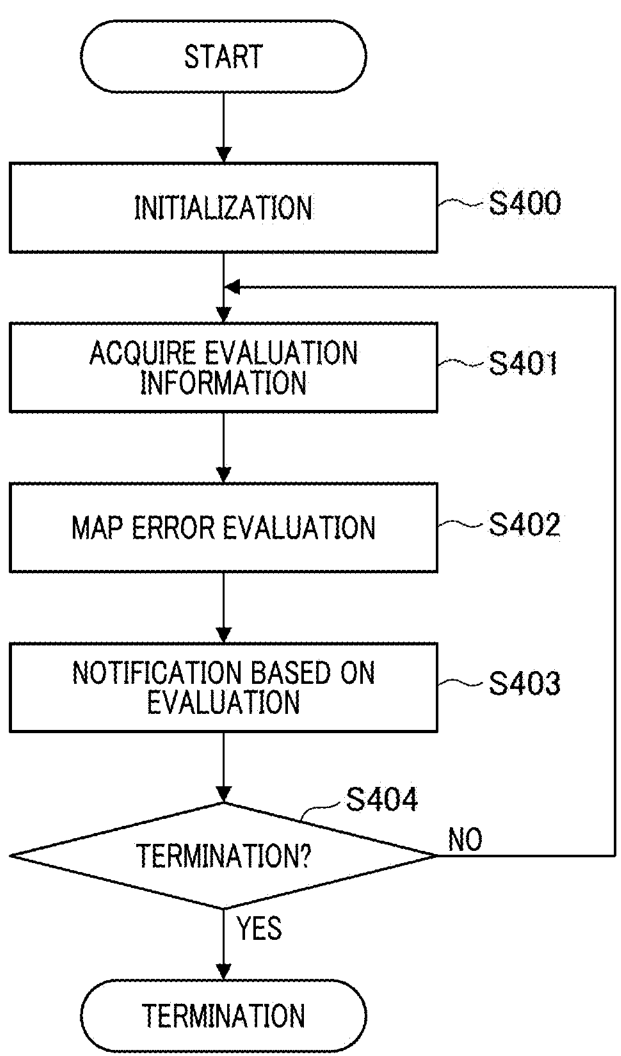
FIG. 4 is a flowchart showing processing performed by the information processing apparatus.

FIG. 4 is a flowchart showing processing performed by the information processing apparatus 100. This processing is realized by the CPU 211 loading a program into the RAM 203 by reading out the program corresponding to the processing content from the ROM 212 or the storage unit 214 and the like, and executing the program.

In step S400, the information processing apparatus 100 initializes the system in conjunction with the start of map generation.

In step S401, the data acquisition unit 307 acquires evaluation information which is information for performing evaluation of the generated map data. Details of the evaluation information will be described below.

In step S402, the map error evaluation unit 308 evaluates the map data error based on the evaluation information acquired in step S401. Details of the error evaluation method will be described below.

In step S403, the notification unit 309 performs notification based on evaluation of errors with respect to the plurality of map data based on the evaluation result of step S402. An example of information of the notification is error information (error amount, error status, and the like). Details of the notification content and notification method will be described below.

In step S404, the information processing apparatus 100 determines whether or not there is a termination instruction from the operator 110, returns to step S401 in a case in which there is no termination instruction, and terminates the processing flow in a case in which there is a termination instruction. It should be noted that the processing may be terminated under predetermined conditions, not limited to a termination instruction by the operator 110. The predetermined conditions include, for example, a case in which a predetermined time has elapsed from the start time of processing, or a case in which the movable apparatus has arrived at a predetermined point.

Here, an example in which the evaluation information acquired in the above-described step S401 is map data will be explained. The data acquisition unit 307 acquires the first map data generated by using a camera among the first map data and the second map data being generated during movement as evaluation information. Specifically, in this basic example, the data acquisition unit 307 acquires position information for each measurement point, that is, coordinate values in the reference coordinate system of the first map data.

Next, the map error evaluation method performed in step S402 will be explained. When generating map data, drift occurs according to the movement distance, and scale error increases. Therefore, the map error evaluation unit 308 evaluates the error in accordance with the travel distance by using the position information of the measurement points acquired in step S401. The distance (Euclidean distance) from the measurement point of one time before at the measurement point i is defined as $d_i$, and the sum of the movement distances from the point at which map alignment was last performed is defined as $d_{sum}=\Sigma d_i$. In a case in which $d_{sum}$ is larger than a threshold of movement distance specified in advance, the map error evaluation unit 308 determines the evaluation result of error of the map data as 1 (large error), and in a case in which $d_{sum}$ is equal to or smaller than the threshold, the map error evaluation unit 308 determines the evaluation result of the error of the map data as 0 (small error).

Next, the error notification method executed in step S403 will be explained. The notification unit 309 displays the evaluation result in step S402 on a GUI (Graphical User Interface).

Figure 5:
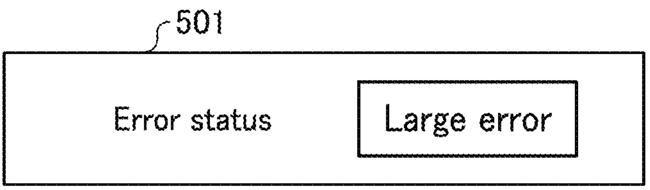
FIG. 5 is a diagram showing a notification example using a GUI by a notification unit.

FIG. 5 is a diagram showing a notification example using a GUI by the notification unit 309. In a case in which the evaluation result of the error in step S401 is 1, the notification unit 309 displays "Error status 'Large error'" as error information 501, and in a case in which the evaluation result is 0, the notification unit 309 displays "Small error". When "Large error" is displayed in step S403, the operator 110 confirms that this display indicates the timing for performing map alignment (that is, map correction).

As described above, according to the basic example of the present embodiment, because the error information 501 of maps from the plurality of sensors is notified to the operator 110, the operator 110 can appropriately grasp information related to errors. In addition, the error information 501 is notified to the operator 110 at an appropriate timing for map correction. Thereby, it is possible for the operator 110 who has received the notification to stop the movable apparatus 10 and perform map correction (map alignment) in order to prevent deterioration of measurement accuracy due to increased processing load of the map generation apparatus 150, and the accuracy of the map can be improved.

Modification Example 1-1

In the above description, an example was explained in which position information of measurement points is acquired as evaluation information and the error according to movement distance is determined. However, evaluation information and error evaluation method are not limited thereto. Hereinafter, modification examples of evaluation information and error evaluation methods will be explained.

Modification Example 1-1-1

For example, the evaluation information may be orientation information for each measurement point. As described above, the map generation apparatus 150 measures not only position but also orientation as information that configures map data. Therefore, the information processing apparatus 100 can use this orientation information as evaluation information.

The orientation change amount from the measurement point of one time before at the measurement point i is defined as $\theta_i$, and the sum of the orientation change amounts from the point at which map alignment was last performed is defined as $\theta_{sum}=\Sigma\theta_i$. In this case, in a case in which $\theta_{sum}$ is larger than a threshold of orientation change amount, the map error evaluation unit 308 determines the evaluation result of error of the map data as 1. In a case in which $\theta_{sum}$ is equal to or smaller than the threshold, the map error evaluation unit 308 determines the evaluation result of error of the map data as 0. Depending on the sensing viewing angle of the sensor of the sensor system 257, because there may be cases in which measurement errors increase due to turning motion of the movable apparatus 10, by using the orientation change amount, the error of map data during turning motion can be evaluated.

Alternatively, the data acquisition unit 307 may acquire both position and orientation information of measurement points as evaluation information, and the map error evaluation unit 308 may evaluate errors based on that position information and orientation information.

Modification Example 1-1-2

The evaluation information may be movement speed or angular velocity. For example, the data acquisition unit 307 may acquire position information and time information thereof for two measurement points (two time points) as evaluation information, calculate the movement speed by using this information, and evaluate the error of the map data by comparing the calculated movement speed with a threshold of the movement speed. Similarly with respect to angular velocity, the data acquisition unit 307 may acquire orientation information and time information thereof for two measurement points as evaluation information, calculate the angular velocity by using this information, and evaluate the error of the map data by comparing the calculated angular velocity with a threshold of the angular velocity.

For example, in a case in which a camera is used as a sensor, when the translational speed or rotational speed of the movable apparatus 10 is fast, the amount of movement of feature points on the image is large, and the measurement accuracy decreases. Therefore, by using the movement speed or angular velocity, it is possible to evaluate the increase in error of the map data associated with the increase in movement speed or angular velocity.

As described above, the form in which the data acquisition unit 307 acquires at least one of position information and orientation information of the movable apparatus 10, and the map error evaluation unit 308 evaluates the error based on that may be appropriately applied to the modification examples to be explained hereinafter and the Second Embodiment (including modification examples).

Modification Example 1-1-3

The evaluation information may be reliability (reliability of the measurement results of the positions and orientations, hereinafter referred to as measurement reliability) with respect to at least one of position and orientation at the time of map generation by the map generation apparatus 150. That is, measurement data from the sensor, which is the measurement reliability, can be used as evaluation information instead of the state of motion such as movement distance or speed as explained so far. In a case in which a camera is used as the sensor, as measurement reliability, there are the number of observed feature points, the distribution of observed feature points in three-dimensional space or on the image, or the reprojection error. For example, the measurement reliability may be set higher as the number of feature points increases or as the reprojection error decreases. The measurement reliability may be a value calculated by a predetermined calculation formula using at least one of these number of feature points, distribution of feature points, and reprojection error as parameters.

In this manner, in a case in which the map error evaluation unit 308 expresses the magnitude of the measurement reliability as a numerical value, the map error evaluation unit 308 can evaluate the degree of error by comparing the reciprocal of that numerical value, which is used as the magnitude of error of the map data, with a threshold. By using measurement data of the sensor as evaluation information instead of the state of motion such as movement distance or speed, it is possible to directly evaluate errors of the map data.

Modification Example 1-1-4

The evaluation information may be the above-described measurement reliability for a plurality of measurement points. For example, the data acquisition unit 307 acquires information of the measurement point at which map alignment was last performed. When the number of measurement points generated since map alignment was performed is denoted as N and the measurement reliability at the measurement point i is denoted as $C_i$, the cumulative reliability $C_{sum}$ is expressed by the following Equation 1.

$$C_{sum} = \frac{1}{\sum_{i}^{N} 1/C_i} \quad \text{(Equation 1)}$$

The map error evaluation unit 308 sets a threshold for the cumulative reliability $C_{sum}$ in advance, determines the evaluation result of the error of the map data as 0 in a case in which $C_{sum}$ is larger than the threshold, and determines the evaluation result of error of the map data as 1 in a case in which $C_{sum}$ is equal to or smaller than the threshold. By using the measurement reliability of a plurality of measurement points as evaluation information, it is possible to evaluate the drift amount more accurately compared to a case in which evaluation is performed with a single measurement point.

Modification Example 1-1-5

In the above description, the map error evaluation unit 308 determined whether the error was large or small by comparing the value of the evaluation information with one threshold. However, the present disclosure is not limited thereto, and the map error evaluation unit 308 may set a plurality of thresholds and express the error amount in three or more levels of states.

Modification Example 1-1-6

The map error evaluation unit 308 may output a continuous error amount or a ratio of the error amount to the threshold as an evaluation result, instead of a discrete error status as described above.

Modification Example 1-1-7

In the above description, although the map error evaluation unit 308 evaluated the error of one map data using one error evaluation method, the present disclosure is not limited thereto, and the map error evaluation unit 308 may evaluate the error of one map data using a plurality of different error evaluation methods. Specifically, the map error evaluation unit 308 may determine the error amount by each error evaluation method, set weights for each method and take a weighted average. In addition, the worst value of each method may be used. By using a plurality of evaluation methods, it is possible to improve the robustness of error evaluation.

Modification Example 1-1-8

In the above description, although the map error evaluation unit 308 evaluated the error of the first map data generated by using a camera, the map error evaluation unit 308 may evaluate the error of the second map data generated using LiDAR. In a case in which LiDAR is used, the measurement reliability can be defined as the sum of the errors between the positions of the measurement point groups and the positions of the point groups in the map data corresponding to those measurement point groups. The positions of the measurement point groups can be calculated from the position/orientation of the measurement points and the measurement data for each measurement point group.

Alternatively, without being limited to the above-described method, the map generation apparatus 150 may use the number of measured point groups or the distribution in three-dimensional space as the measurement reliability.

Modification Example 1-1-9

In the above description, although the map generation apparatus 150 used a camera and LiDAR as the sensors of the sensor system 257, the sensors used are not limited to these. A ToF sensor that generates depth images, a color camera, an IMU, GNSS, wheel odometry, and the like may be used. For example, in the above-described Modification Example 1-1-2, IMU may be used for measuring angular velocity. It should be noted that measurement by IMU, GNSS, wheel odometry, and the like may be used to supplement measurements by a camera or LiDAR. It should be further noted that this Modification Example 1-1-9 is applicable to all previously mentioned modifications except for Modification Example 1-1-3.

Modification Example 1-1-10

In the above description, although the map error evaluation unit 308 evaluated the error of one map data (for example, the first map data by a camera), the map error evaluation unit 308 may evaluate the errors of each of the map data generated by each of a plurality of sensors. In that case, the map error evaluation unit 308 may, for example, use the worst value of the error evaluation results of each map data as the evaluation result. By relatively evaluating the plurality of maps, even in cases in which a decrease in accuracy occurs in any of the maps, the decrease in accuracy can be detected.

Modification Example 1-2

Modification Example 1-2-1

In the above description, the notification unit 309 notified the error information 501 (error status) evaluated by the map error evaluation unit 308. However, the notification unit 309 is not limited thereto and the notification unit 309 may provide notification of an operation method for the movable apparatus 10. The operation method for the movable apparatus 10 is an example of information of notification based on evaluation of error by the notification unit 309. For example, the notification unit 309 may notify "stop" to prompt stopping of the movable apparatus 10. By stopping the movable apparatus 10, it is possible to secure computational resources of the map generation apparatus 150 that can be used for map alignment, and it is possible to improve the accuracy of the map data.

The notification unit 309 may notify both the error information 501 and the operation method for the movable apparatus 10.

Modification Example 1-2-2

Although in the above description the notification unit 309 performed notification by using a GUI, the notification is not limited thereto and sound or light may also be used. For example, in a case in which sound is used, the notification unit 309 may read out the error amount of the map data. In a case in which light is used, the notification unit 309 may assign a degree of error amount of the map data to each color of light in advance, and emit light of the color corresponding to the result of step S402. These notification methods may be combined. The operability for the operator 110 can be improved by these methods.

Second Embodiment

Figure 6:
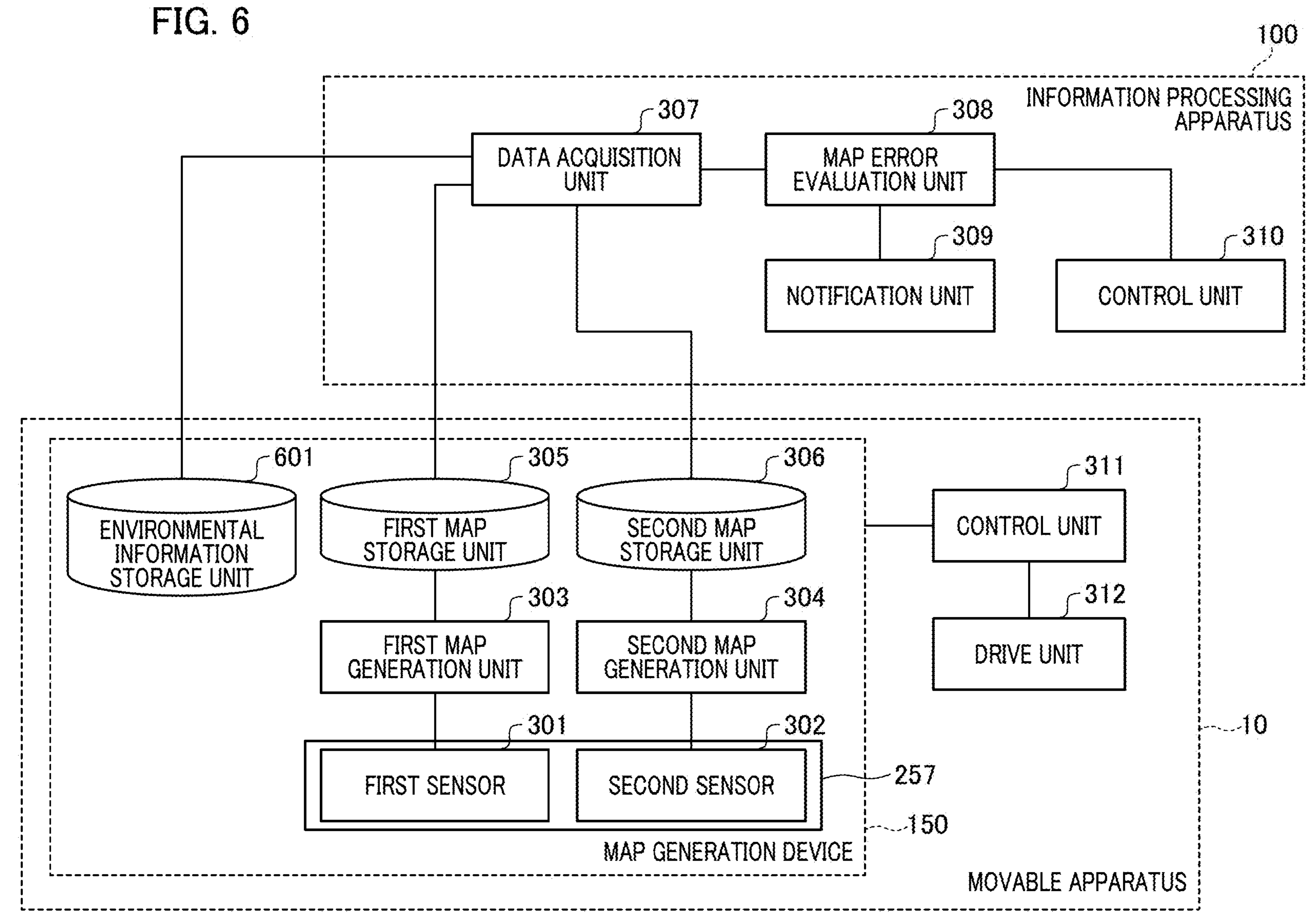
FIG. 6 is a diagram showing an example of a functional configuration of an information processing system according to a Second Embodiment.

Next, a Second Embodiment will be explained. In the following explanation, explanations of configurations and functions similar to those of the First Embodiment will be omitted, and differences from the First Embodiment will be explained. FIG. 6 is a diagram showing an example of a functional configuration of an information processing system according to the Second Embodiment. This information processing system is similar to the information processing system according to the above-described First Embodiment except that the movable apparatus 10 (for example, the map generation apparatus 150) further includes an environment information storage unit 601.

In the First Embodiment, the data acquisition unit 307 acquired map data being generated (measurement data and position/orientation information for each measurement point) or measurement reliability as evaluation information. The data acquisition unit 307 of the present embodiment acquires environment information (or prior information) of the movable apparatus 10 as evaluation information, in addition to map data and the like. The environment information storage unit 601 stores this environment information.

Environment information includes, for example, at least one of sensor-related information related to the sensor and movement path-related information related to the movement path of the movable apparatus 10. The sensor-related information includes at least one of the type of the sensor (sensor type), characteristics of the sensor (sensor characteristics), and installation position of the sensor. The sensor characteristics include sensing range, sensing accuracy, and the like. The movement path-related information includes at least one of lighting conditions, stationary structure information, and scheduled passage position information. The stationary structure information is information on columns, wall surfaces, or fixed installations and the like around the movable apparatus 10 in motion, and may be acquired from, for example, CAD or BIM information of the map generation area. CAD is an abbreviation for Computer Aided Design, and BIM is an abbreviation for Building Information Modeling. The movement path-related information may include, in addition to the above-described information, information on road surface conditions such as road surface unevenness, inclination angle, and the like.

It should be noted that the data acquisition unit 307 of the information processing apparatus 100 may acquire the sensor-related information through a separate route instead of acquiring the sensor-related information from the map generation apparatus 150. Acquiring through a separate route means, for example, that the operator 110 inputs the sensor-related information to the information processing apparatus 100 in advance, or that the sensor-related information is stored in an external server in advance and the information processing apparatus 100 acquires the sensor-related information from that external server, and the like.

Basic Example

As a basic example of the present embodiment, an example in which the sensor type and lighting conditions among the above-described environment information are utilized will be explained. In addition, a camera is used as the first sensor 301 and LiDAR is used as the second sensor 302. Sensor type refers to types including camera, Lidar, ToF sensor, IMU, and the like. Lighting conditions refer to, for example, information on illuminance for each section when the map generation area is divided into sections of a predetermined area (for example, 5 m on one side). In a case in which the movable apparatus 10 moves indoors, the illuminance that the sensor receive from lighting installed on the ceiling or wall surfaces differs depending on the position of the movable apparatus 10.

The information processing system in this basic example estimates the measurement accuracy of the sensor and evaluates map error by using the sensor type and lighting conditions. In step S401 of FIG. 4, the data acquisition unit 307 acquires, for example, sensor type and lighting conditions as environment information in addition to the map data being generated by the map generation apparatus 150.

In step S402 of FIG. 4, the map error evaluation unit 308 evaluates the error of the map data by using the sensor type and lighting conditions acquired in step S401. Specifically, the map error evaluation unit 308 sets as to whether or not there is an influence of illuminance for each sensor type (whether or not the sensors are affected). In the case of a camera, the camera is set to "be affected" because lower illuminance necessitates raising the gain, which makes the image more susceptible to noise and decreases the measurement accuracy of position/orientation. The map error evaluation unit 308 compares a threshold of illuminance set in advance with the illuminance at the current position of the movable apparatus 10. The illuminance at the current position of the movable apparatus 10 can be calculated from the information on the lighting environment and the position of the movable apparatus 10.

Then, in a case in which the illuminance at the current position is equal to or lower than the threshold, the map error evaluation unit 308 determines the evaluation result of error of the map data generated by the sensor (here, for example, a camera) set to "be affected" by illuminance as 1. In a case in which the illuminance at the current position exceeds the threshold, the map error evaluation unit 308 determines the evaluation result of error of the map data as 0. Because LiDAR is less susceptible to the influence of illuminance, the evaluation result of error of the map data is always set to 0.

In this manner, according to the present embodiment, by using the environment information of the movable apparatus 10 at the time of map generation, it becomes possible to indirectly evaluate the error of the map data, and it is possible to determine the necessity of map alignment.

Modification Example 2-1

In Modification Example 2-1, sensor characteristics and stationary structure information are utilized as environment information. The sensor characteristics may be any characteristic that can estimate the measurement accuracy of the sensor and the measurement data that can be acquired by using the position/orientation information of the movable apparatus 10. Among the sensor characteristics, the sensing range is, for example, the sensing viewing angle and the sensing distance.

The stationary structure information as information acquired from CAD or BIM includes, for example, position information of stationary structures (structure position information) and characteristics thereof (structure characteristics). Structure characteristics refer to, for example, the material or the presence or absence of texture thereof, and the like. The information acquired from CAD or BIM may be any information that can estimate the measurement accuracy of the sensor and the measurement data that can be acquired.

Modification Example 2-1-1

In the present Modification Example 2-1-1, an example of utilizing sensor characteristics and structure position information as environment information will be explained. The map error evaluation unit 308 can determine whether the sensor can measure the structure from the relative position/orientation between the measurement point and one or more stationary structures (hereinafter referred to as "structures"), and evaluate the error of the map data based on the presence or absence of structures. For example, in a case in which 2D (Dimension)-LiDAR is used, the measurement viewing angle $\alpha_i$ (the viewing angle that determines the range of existence of the structure at the sensor) is calculated from the relative position/orientation between the sensor and the structure i, and the sensing range. Here, the sensing range is the sensing viewing angle and sensing distance. Then, the error of the map data is evaluated by the following Equation (2). β is the sensing viewing angle, and N is the number of structures.

$$\frac{\sum_{i}^{N}\alpha_i}{\beta} \quad \text{(Equation 2)}$$

That is, the value shown in Equation 2 is the ratio of one or more measurable structures in the sensing viewing angle. By evaluating this ratio, it is possible to understand the expected accuracy of the calculated position/orientation information. Similarly, in a case in which a camera is used as the sensor, the ratio of structures that can be captured in the image plane may be calculated.

Thus, by using the sensing range and the positional relationship of structures, it is possible to predict locations for which measurement is difficult for the sensor.

Modification Example 2-1-2

In the present Modification Example 2-1-2, an example of utilizing sensor characteristics and structure characteristics as environment information will be explained. The information processing apparatus 100 or the map generation apparatus 150 specifies structure characteristics for which a decrease in measurement accuracy is expected for each sensor to be used. For example, in the case of LiDAR, measurement accuracy decreases because laser light passes through glass surfaces. In the case of a camera, it is difficult to detect feature points if there is no texture on the wall surface, and measurement accuracy decreases. When evaluating the error of map data, the map error evaluation unit 308 may calculate the ratio of the measurement viewing angle of structures for which measurement accuracy decreases in the sensing viewing angle for each sensor. The map generation apparatus 150 may calculate this ratio, and the data acquisition unit 307 may acquire the calculation result as evaluation information.

Thus, by using sensor characteristics and structure characteristics, it is possible to predict locations for which measurement is difficult for the sensor.

Modification Example 2-2

In the present Modification Example 2-2, scheduled passage position information of the movable apparatus 10 is utilized as environment information. The scheduled passage position information may be any information that can evaluate the error of the map by comparing the scheduled passage position information with the position of the measurement point. The scheduled passage position information includes, for example, scheduled work points of the movable apparatus 10 or any point on a preset map generation path (any point on that path) along which the movable apparatus 10 is scheduled to move when generating the map. A scheduled work point is a location at which the movable apparatus 10 performs a single task that should be carried out as a work robot, such as, for example, in a case in which the movable apparatus 10 is a robot that transports cargo, a point at which cargo is received or unloaded, and the like.

Modification Example 2-2-1

For example, in a case in which the map generation path among scheduled passage positions is utilized, the map error evaluation unit 308 denotes e/d as the error evaluation result of the map data. d is the distance between the current position of the movable apparatus 10 and the scheduled work point, and e is the error calculated by the map data error evaluation method in the First Embodiment. By evaluating that the error is larger as d becomes smaller, it is possible to detect an increase in map error as the movable apparatus 10 approaches the scheduled work point at which high-precision positioning is required.

Modification Example 2-2-2

Alternatively, in a case in which the map generation path among scheduled passage positions is utilized, the map error evaluation unit 308 denotes de as the error evaluation result of the map data. d is the distance between the current position of the movable apparatus 10 and the nearest point on the map generation path from that current position, and e is the error calculated by the map data error evaluation method in the First Embodiment. By evaluating that the error is larger as the deviation between the map generation path that was planned by measuring physical distance in advance and the current measured position becomes larger, that is, as de becomes larger, it is possible to detect an increase in drift error with higher accuracy.

Third Embodiment

In the above-described First and Second Embodiments, a method for evaluating the error of one map data (in Modification Example 1-1-10, the errors of each of a plurality of map data) in step S402 of FIG. 4 was described. In the Third Embodiment, a method for evaluating the error between a plurality of map data by using the plurality of map data will be described.

Basic Example

In the present embodiment, the map error evaluation unit 308 evaluates the error between maps by using, for example, the first map data and the second map data. Specifically, in step S402 of FIG. 4, $P_{ia}$ is denoted as the measurement position of the first sensor 301 at time i, and $P_{ib}$ is denoted as the measurement position of the second sensor 302. Then, the map error evaluation unit 308 calculates an error of the measurement positions as the Euclidean distance between $P_{ia}$ and $P_{ib}$. The map error evaluation unit 308 denotes the evaluation result of error of the map as 1 in a case in which the calculated distance is larger than a threshold set in advance, and as 0 in a case in which the calculated distance is equal to or smaller than the threshold.

The map error evaluation unit 308 may output the evaluation of the error based on the error of the respective orientations measured by the first sensor 301 and the second sensor 302, instead of, or in addition to, the position information.

According to the present embodiment, it is possible to detect a case in which an error occurs between a plurality of maps, even if the error is small for each individual map.

Modification Example

Modification Example 3-1-1

In the above, the map error evaluation unit 308 evaluated the error from the measurement result at one measurement point for each sensor. However, the present disclosure is not limited thereto, and the map error evaluation unit 308 may use the cumulative sum of measurement position errors of a plurality of measurement points for each sensor as the error between a plurality of maps.

Modification Example 3-1-2

In the above, although the map error evaluation unit 308 evaluated the relative position error of each measurement position for each sensor, the present disclosure is not limited thereto, and relative orientation error may be used.

Fourth Embodiment

Basic Example

In the above First to Third Embodiments, a method for evaluating error by the map error evaluation unit 308 by using mainly map data acquired by the data acquisition unit 307 was described. In a Fourth Embodiment, a method for the map error evaluation unit 308 to evaluate the error of the map by using data other than map data is described. Specifically, in step S401 of FIG. 4, the data acquisition unit 307 acquires information on the processing load status of the map generation apparatus 150 that is performing map generation, as evaluation information. Then, in step S402, the map error evaluation unit 308 evaluates the error of the map data based on the processing load status.

The information on the processing load status includes, for example, at least one of CPU (251) usage rate and memory (RAM 253) usage rate. When the processing load of the map generation apparatus 150 becomes high, the position/orientation measurement processing cannot keep up with the sampling cycle of the sensors, and the measurement accuracy decreases. In addition, because map correction uses a large amount of CPU resources, when the CPU usage rate is high, the processing time increases, which leads to a decrease in measurement accuracy.

In step S402 of FIG. 4, a threshold is set for each of the CPU usage rate and the memory usage rate. The map error evaluation unit 308 determines the evaluation result of the error of the map as 1 in a case in which at least one of the CPU usage rate or the memory usage rate exceeds the respective threshold thereof. In a case in which both the CPU usage rate and the memory usage rate are equal to or lower than their respective thresholds, the map error evaluation unit 308 determines the evaluation result of error of the map as 0.

According to the present embodiment, it is possible to detect a decrease in position/orientation measurement accuracy associated with an increase in processing load. For example, the information processing apparatus 100 can perform map alignment by decelerating or stopping the movable apparatus 10 at a stage at which the error of the map is small, thereby improving the accuracy of the map. When the movable apparatus 10 decelerates or stops, because there is little change in the scene of the environment being measured, the accuracy of correspondence between feature points in the case of using a camera or point groups in the case of using LiDAR and the map improves. As a result, it is possible to suppress the decrease in measurement accuracy due to the influence of processing load.

Modification Example 4-1

In the present embodiment, in step S403, the notification unit 309 may notify the status of the map alignment processing as information of notification based on evaluation of error. The status of map alignment processing refers to "waiting for execution", "in progress", or "completed" of the map alignment processing.

In a case in which the status is "waiting for execution", the error of the map is large, and it is preferable to perform alignment. Therefore, the operator 110 performs an operation to stop the movable apparatus 10 in order to reduce the processing load of position measurement. In a case in which the status is "in progress", because a processing load increase due to alignment is expected, the operator 110 maintains the stopped state of the movable apparatus 10. In a case in which the status is "completed", the operator 110 determines that there is no longer a processing load increase due to alignment, and performs an operation to move the movable apparatus 10.

As described above, it becomes possible to operate the movable apparatus 10 according to the status of map alignment.

Modification Example 4-2

Although in the present embodiment the map error evaluation unit 308 evaluates the error of the map without using map data by using the processing load status of the map generation apparatus 150, any information that can be used to estimate measurement error. For example, the map error evaluation unit 308 may use the measurement data itself acquired by the sensors. In a case in which LiDAR is used as a sensor, the data acquisition unit 307 acquires the received light intensity for each point group. It can be determined that the higher the received light intensity, the more point groups of objects with high reflectance can be acquired, and it can be inferred that the measurement accuracy is also high. Therefore, for example, the map error evaluation unit 308 sets a threshold for the received light intensity and evaluates the ratio of point groups having a received light intensity equal to or lower than the threshold as the error amount. This method is not limited thereto, and evaluation may be performed based on data deficiencies, such as the amount of point cloud data.

In a case in which a camera is used as a sensor, the data acquisition unit 307 acquires captured images. For example, the map error evaluation unit 308 can evaluate the error based on the degree of deficiency in a case in which there are deficiencies such as pixel values becoming 0. Specifically, in a case in which the number of deficiencies exceeds a threshold, the map error evaluation unit 308 denotes the evaluation result of the error of the map as 1. Alternatively, not limited to binarized evaluation, the map error evaluation unit 308 may evaluate the error amount according to the number of deficiencies, such that the error amount is larger as the number of deficiencies increases.

In addition, because more feature points can be detected in images having high contrast, the map error evaluation unit 308 may calculate a histogram of pixel values and evaluate the error of the map based on the overall contrast of the image. Alternatively, the map error evaluation unit 308 may evaluate the error based on the presence or absence of moving objects in the image. The map error evaluation unit 308 may estimate the presence or absence of moving objects from pattern matching using SSD with captured data and moving object template data, or may use an image recognition method using a learned model such as CNN. SSD is an abbreviation for Sum of Squared Difference, and CNN is an abbreviation for Convolutional Neural Network.

Fifth Embodiment

In the First to Fourth Embodiments, the content notified by a GUI in step S403 was the error status calculated from the error evaluation result in S402. In a Fifth Embodiment, a display method using a GUI that includes map data will be explained.

Figure 7:
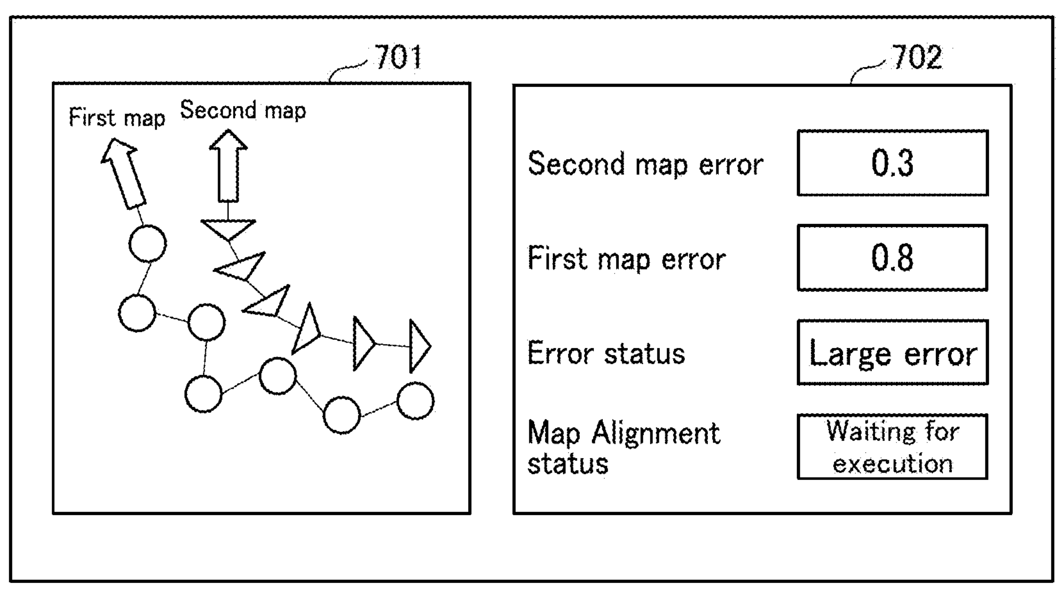
FIG. 7 is a diagram showing a notification example using a GUI by a notification unit.

FIG. 7 is a diagram showing a notification example using a GUI by the notification unit 309. This notification displays a plurality of maps (here, for example, a first map and a second map) 701 and error information 702 of these maps. The error information 702 includes the error amount of each map, the status of each error based on the evaluation result, and the map alignment status based on the status of each error. As for the map alignment status, there are statuses of "waiting for execution", "in progress", and "completed" as explained in Modification Example 4-1 of the Fourth Embodiment.

Because the error status and map alignment status of each map are displayed, the operator 110 can recognize the necessity of operating the movable apparatus 10 for map alignment. Then, the information processing apparatus 100 can prompt the operator 110 to stop the movable apparatus 10. As a result, the accuracy of the map data improves. Furthermore, by displaying the maps 701, the information processing apparatus 100 enables the operator 110 to confirm the state of errors and the effect of alignment.

It should be noted that the maps 701 and the error information 702 may be displayed as separate independent screens.

Sixth Embodiment

In the above-described First to Fifth Embodiments, the notification unit 309 performed notification of error in step S403. In a Sixth Embodiment, the notification unit 309 may omit notifying the user of the error, or alternatively, the information processing apparatus 100 may control the movable apparatus 10 in addition to notifying the user of the error. In this case, the control unit 310 of the information processing apparatus 100 outputs control information to the movable apparatus 10 based on the evaluation result of the map error evaluation unit 308. For example, in a case in which the evaluation result of error by the map error evaluation unit 308 in step S402 of FIG. 4 is 1 (large error), the control unit 310 outputs control information to the movable apparatus 10 for performing control to decelerate or stop the movable apparatus 10. The control unit 310 is an example of a control unit that controls movement of the movable apparatus 10 based on evaluation of error.

When the movement speed of the movable apparatus 10 decreases, there is little change in the scene of the environment being measured. Therefore, the accuracy of correspondence between feature points in the case of using a camera or point groups in the case of using LiDAR and the map improves. In addition, when the movement speed of the movable apparatus 10 decreases, it is also possible to suppress the decrease in measurement accuracy due to the influence of processing load.

Other Embodiments

Although in the above embodiments the map generation apparatus 150 included the first map generation unit 303 and the second map generation unit 304, the information processing apparatus 100 may include these and generate map data independently. In that case, the information processing apparatus 100 generates map data by acquiring measurement data of each sensor from the movable apparatus 10.

In addition, for example, in the Fourth Embodiment, the data acquisition unit 307 of the information processing apparatus 100 acquired the processing load status of the map generation apparatus 150. However, in a case in which the information processing apparatus 100 generates a map, the information processing apparatus 100 may acquire its own processing load status, and the map error evaluation unit 308 may evaluate the error of the map data based on that processing load status information.

At least a part of the functions of the information processing apparatus 100 shown in FIG. 3 and FIG. 6 may be provided in the movable apparatus 10 or the map generation apparatus 150. For example, the movable apparatus 10 or the map generation apparatus 150 may be provided with the data acquisition unit 307, the map error evaluation unit 308, and the notification unit 309. In that case, for example in Modification Example 1-2-1 or the Sixth Embodiment, the control unit 311 may control the movable apparatus 10 based on the evaluation result of the map error evaluation unit 308. In addition, for example in FIG. 6, the information processing apparatus 100 may store at least a part of the information stored in the environment information storage unit 601.

At least two of each of the above-described embodiments and each of the modification examples may be combined.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-195642, filed Nov. 17, 2023, which is hereby incorporated by reference wherein in its entirety.

What is claimed is:

1. An information processing apparatus comprising:
one or more memories storing instructions; and
one or more processors executing the stored instructions to:
acquire evaluation information for performing evaluation of at least one of a plurality of map data each generated based on measurement data acquired by at least one sensor of a plurality of sensors arranged on a movable apparatus;
evaluate an error of at least one map data of the plurality of map data based on the evaluation information; and
perform notification based on the evaluation of the error,
wherein the evaluation information includes information on a processing load status of a computer that generates the plurality of map data, and
wherein the one or more processors further execute the stored instructions to evaluate the error of the map data based on the processing load status.

2. The information processing apparatus according to claim 1, wherein the evaluation information includes information on position and orientation of the movable apparatus at a measurement point of the map data, and
wherein the one or more processors further execute the stored instructions to evaluate the error of the map data based on the position and orientation of the movable apparatus.

3. The information processing apparatus according to claim 1, wherein the evaluation information includes reliability of position and orientation of the movable apparatus at a measurement point of the map data, and
wherein the one or more processors further execute the stored instructions to evaluate the error of the map data based on the reliability.

4. The information processing apparatus according to claim 1, wherein the evaluation information includes environment information of the movable apparatus, and
wherein the one or more processors further execute the stored instructions to evaluate the error of the map data based on the environment information.

5. The information processing apparatus according to claim 4, wherein the environment information includes at least one of sensor-related information related to at least one sensor among the plurality of sensors, and movement path-related information related to a movement path of the movable apparatus.

6. The information processing apparatus according to claim 5, wherein the sensor-related information includes at least one of a type of the sensor, characteristics of the sensor, and an installation position of the sensor.

7. The information processing apparatus according to claim 1, wherein the evaluation information includes information on position and orientation of the movable apparatus at each measurement point of the plurality of map data, and
wherein the one or more processors further execute the stored instructions to evaluate an error between the plurality of map data based on the information on each position and each orientation between the plurality of map data.

8. The information processing apparatus according to claim 1, wherein the information on processing load status includes at least one of CPU usage rate and memory usage rate of the computer.

9. The information processing apparatus according to claim 1, wherein the evaluation information includes the measurement data of at least one of the plurality of sensors, and
wherein the one or more processors further execute the stored instructions to evaluate the error of the map data based on the measurement data.

10. The information processing apparatus according to claim 9, wherein the one or more processors further execute the stored instructions to evaluate the error of the map data based on a number of deficiencies of the measurement data.

11. The information processing apparatus according to claim 1, wherein the notification based on the evaluation of an error includes at least one of error information and an operation method of the movable apparatus.

12. An information processing apparatus comprising:
one or more memories storing instructions; and
one or more processors executing the stored instructions to:
acquire evaluation information for performing evaluation of at least one of a plurality of map data each generated based on measurement data acquired by at least one sensor of a plurality of sensors arranged on a movable apparatus;
evaluate an error of at least one map data of the plurality of map data based on the evaluation information; and
control movement of the movable apparatus based on the evaluation of the error,
wherein the evaluation information includes information on a processing load status of a computer that generates the plurality of map data, and
wherein the one or more processors further execute the stored instructions to evaluate the error of the map data based on the processing load status.

13. A movable apparatus comprising:
one or more memories storing instructions; and
one or more processors executing the stored instructions to:
generate a plurality of map data, wherein each of the plurality of map data is generated based on measurement data acquired by at least one sensor of a plurality of sensors arranged on the movable apparatus;
acquire evaluation information for performing evaluation of at least one of the plurality of map data;
evaluate an error of at least one map data of the plurality of map data based on the evaluation information; and
perform notification based on the evaluation of the error, wherein the evaluation information includes information on a processing load status of a computer that generates the plurality of map data, and wherein the one or more processors further execute the stored instructions to evaluate the error of the map data based on the processing load status.

14. A movable apparatus comprising:

one or more memories storing instructions; and one or more processors executing the stored instructions to:

generate a plurality of map data, wherein each of the plurality of map data is generated based on measurement data acquired by at least one sensor of a plurality of sensors arranged on the movable apparatus;

acquire evaluation information for performing evaluation of at least one of the plurality of map data;

evaluate an error of at least one map data of the plurality of map data based on the evaluation information; and control movement of the movable apparatus based on the evaluation of the error, wherein the evaluation information includes information on a processing load status of a computer that generates the plurality of map data, and wherein the one or more processors further execute the stored instructions to evaluate the error of the map data based on the processing load status.

15. An information processing method for an information processing apparatus, the method comprising:

acquiring evaluation information for performing evaluation of at least one of a plurality of map data, each generated based on measurement data acquired by at least one sensor of a plurality of sensors arranged on a movable apparatus;

evaluating an error of at least one map data of the plurality of map data based on the evaluation information; and performing notification based on the evaluation of the error, wherein the evaluation information includes information on a processing load status of a computer that generates the plurality of map data, and wherein the method further comprises executing the stored instructions to evaluate the error of the map data based on the processing load status.

16. An information processing method for an information processing apparatus, the method comprising:

acquiring evaluation information for performing evaluation of at least one of a plurality of map data each generated based on measurement data acquired by at least one sensor of a plurality of sensors arranged on a movable apparatus;

evaluating an error of at least one map data of the plurality of map data based on the evaluation information; and controlling movement of the movable apparatus based on the evaluation of the error, wherein the evaluation information includes information on a processing load status of a computer that generates the plurality of map data, and wherein the method further comprises executing the stored instructions to evaluate the error of the map data based on the processing load status.

17. A non-transitory storage medium storing a control program of an information processing apparatus causing a computer to perform each step of an information processing method of the information processing apparatus, the method comprising:

acquiring evaluation information for performing evaluation of at least one of a plurality of map data, each generated based on measurement data acquired by at least one sensor of a plurality of sensors arranged on a movable apparatus;

evaluating an error of at least one map data of the plurality of map data based on the evaluation information; and performing notification based on the evaluation of the error, wherein the evaluation information includes information on a processing load status of a computer that generates the plurality of map data, and wherein the method further comprises executing the stored instructions to evaluate the error of the map data based on the processing load status.

18. A non-transitory storage medium storing a control program of an information processing apparatus causing a computer to perform each step of an information processing method of the information processing apparatus, the method comprising:

acquiring evaluation information for performing evaluation of at least one of a plurality of map data, each generated based on measurement data acquired by at least one sensor of a plurality of sensors arranged on a movable apparatus;

evaluating an error of at least one map data of the plurality of map data based on the evaluation information; and controlling movement of the movable apparatus based on the error evaluation, wherein the evaluation information includes information on a processing load status of a computer that generates the plurality of map data, and wherein the one or more processors further comprises executing the stored instructions to evaluate the error of the map data based on the processing load status.

* * * * *